(12) United States Patent
Farrow

(10) Patent No.: US 6,935,309 B1
(45) Date of Patent: Aug. 30, 2005

(54) THROTTLE PLATE MANIPULATOR

(76) Inventor: Willie Farrow, 5476 Buckskin Dr., Fontana, CA (US) 92336

( * ) Notice: Subject to any disclaimer, the term of this patent is extended or adjusted under 35 U.S.C. 154(b) by 0 days.

(21) Appl. No.: 10/992,484

(22) Filed: Nov. 18, 2004

(51) Int. Cl.[7] .................................... F02D 7/00
(52) U.S. Cl. ................ 123/396; 123/398; 123/400; 29/239
(58) Field of Search .................. 123/396, 398, 123/400; 29/239

(56) References Cited

U.S. PATENT DOCUMENTS

| 4,108,120 A |   | 8/1978  | Woelffer ............... 123/103 |
|-------------|---|---------|----------------------------------|
| 4,601,277 A |   | 7/1986  | Cook .................... 123/571 |
| 4,974,444 A | * | 12/1990 | Neubacher ............. 73/118.1  |
| 5,839,419 A | * | 11/1998 | Hawley ................. 123/398  |
| 6,173,939 B1| * | 1/2001  | Dottavio et al. ....... 123/339.15|
| 6,276,230 B1|   | 8/2001  | Crum .................... 74/551.9|
| 6,877,723 B2| * | 4/2005  | Martinsson et al. ..... 261/23.3  |

* cited by examiner

Primary Examiner—Erick Solis
(74) Attorney, Agent, or Firm—Goldstein Law Offices, P.C.

(57) ABSTRACT

A throttle plate manipulator, for allowing an engine to operate that has a throttle plate, the throttle plate having a gas mixer having cross-hairs including a main opening and vertical and horizontal bars extending across the opening, the throttle plate having a butterfly located behind the cross hairs that controls the engine speed. The manipulator includes a manipulator disc that secures over the cross-hairs using an attachment rod having a hook that hooks behind one of the bars of the cross-hairs, and a control rod that extends through the manipulator disc and engages the butterfly. Fuel-air flow into the engine is allowed and adjusted as desired by rotating the control rod to advance the control rod toward the butterfly.

10 Claims, 5 Drawing Sheets

THROTTLE PLATE MANIPULATOR

BACKGROUND OF THE INVENTION

The invention relates to a throttle plate manipulator. More particularly, the invention relates to a device for manipulating the throttle plate of a vehicle such as a bus, for allowing the bus engine to be operated even when a throttle plate failure has occurred.

In light of energy and pollution concerns, an ever increasing number of buses that operate on compressed natural gas have been placed into service in cities, towns, and municipalities around the country. One commonly occurring problem that results in frequent service calls is with the throttle plate actuator component that controls the fuel-air intake of the engine. The throttle plate actuator is controlled by an electronic control module ("ECM"). The throttle plate actuator is located immediately behind a gas mixer which includes a cross-hair structure through which gas and air is introduced to the engine.

The ECM has a specific programming that determines whether the throttle plate actuator meets certain constraints and thereby allows the engine to continue to operate. If, however, the throttle plate falls outside of these programmed constraints, the ECM will shut-down the engine, and not allow it to operate. Unfortunately, repairing the throttle plate to the satisfaction of the ECM cannot be performed on the road. Since the bus cannot be operated, the bus must be towed back to the garage.

Towing a bus is a very time consuming and dangerous job. It requires two mechanics to safely tow a bus back to the maintenance facility. Considering the frequency that such breakdowns occur, towing costs quickly add up. In addition, the requirement that the bus be towed further delays getting the bus out of a possibly hazardous breakdown location, and back into service. Still further, towing is a dangerous activity, and greatly increases the risk of injury while on the road.

SUMMARY OF THE INVENTION

It is an object of the invention to provide a tool that aids a mechanic in returning a bus to a maintenance facility under its own power after a throttle plate actuator failure. Accordingly, the present invention bypasses the ECM and allows the bus to operate despite the unwillingness of the ECM to allow the bus to operate.

It is a further object of the invention to provide a tool that physically operates the throttle plate actuator, so that the bus engine can be operated. Accordingly, the throttle plate manipulator of the present invention easily installs onto the gas mixer and engages the throttle plate actuator to allow the mechanic to physically manipulate the throttle plate.

The invention is a throttle plate manipulator, for allowing an engine to operate that has a throttle plate, the throttle plate having a gas mixer having cross-hairs including a main opening and vertical and horizontal bars extending across the opening, the throttle plate having a butterfly located behind the cross hairs that controls the engine speed. The manipulator includes a manipulator disc that secures over the cross-hairs using an attachment rod having a hook that hooks behind one of the bars of the cross-hairs, and a control rod that extends through the manipulator disc and engages the butterfly. Fuel-air flow into the engine is allowed and adjusted as desired by rotating the control rod to advance the control rod toward the butterfly.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
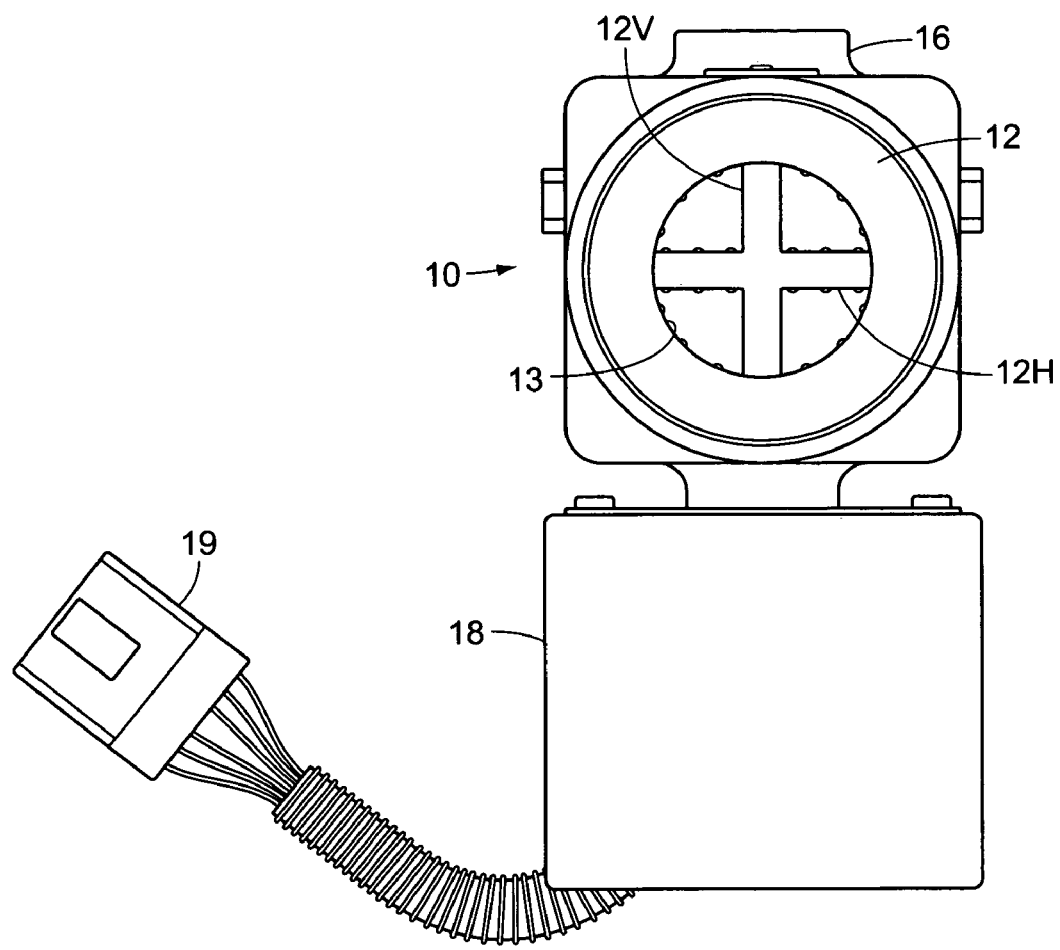
FIG. 1 is a front elevational view, showing a gas mixer and throttle plate actuator assembly.
Figure 2:
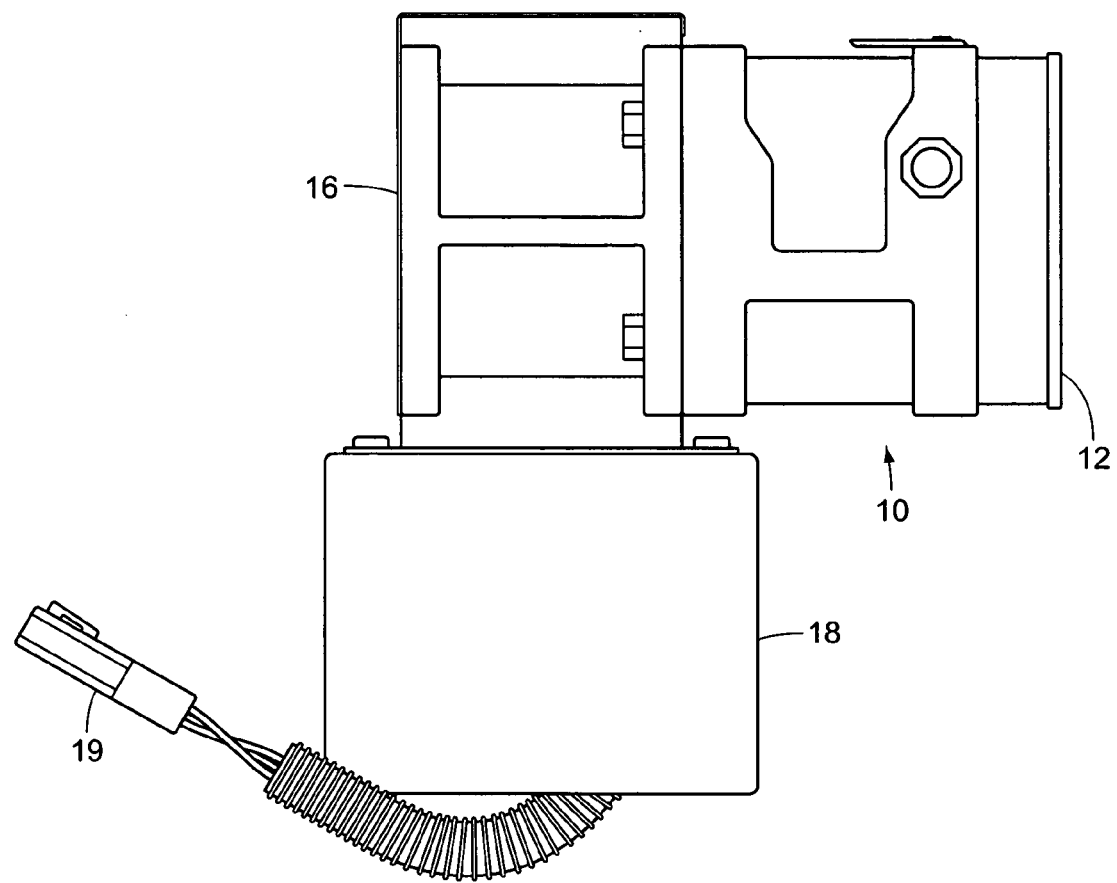
FIG. 2 is a side elevational view thereof.

FIG. 1 and FIG. 2 show a gas mixer 10 that forms a part of a compressed natural gas engine, commonly used in buses. The gas mixer 10 is located immediately in front of a throttle plate 16, which is operated by a throttle plate actuator 18. The throttle plate actuator 18 is operated by an Electronic Control Module (ECM), which is connected to the throttle plate actuator with an ECM connection 19. The gas mixer 10 includes cross-hairs 12, which defines a port through which air enters the gas mixer 10. In particular, the cross-hairs 12 includes a main opening 13, a vertical bar 12V, and horizontal bar 12H. The vertical bar 12V and horizontal bar 12H cross each other and together divide the main opening 13 into quadrants. A butterfly 14 is located immediately behind the cross-hairs 12. The butterfly 14 controls fuel-air flow into the engine and thus adjusts the fuel-air mixture introduced into the engine. In particular, as the butterfly 14 is pressed inwardly from the cross-hairs 12, it increases the flow of fuel and air introduced thereinto. Operation of the engine requires sufficient opening of the butterfly 14. Further, as the butterfly 14 is moved inwardly, the engine RPM increases. Ordinarily, the butterfly 14 is operated by the throttle plate actuator 18. When certain engine conditions are not met, however, the ECM ceases to operate the throttle plate actuator 18, and thus the butterfly 14 remains closed and the engine cannot operate.

Figure 3:
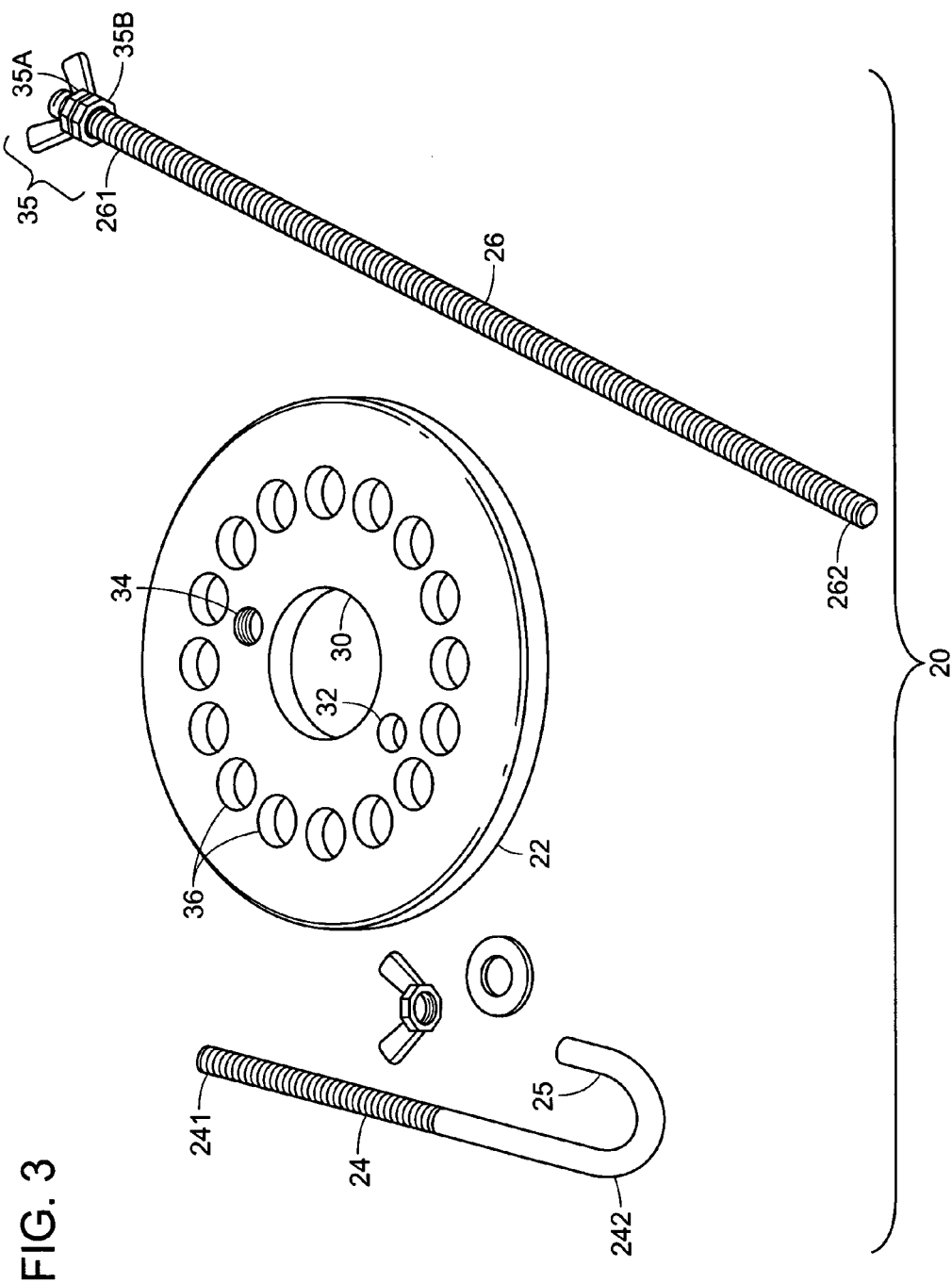
FIG. 3 is a top plan view (diagrammatic perspective view), showing the throttle plate manipulator according to the present invention.

FIG. 3 is a top plan view (diagrammatic perspective view), showing various components of a throttle plate manipulator 20 according to the present invention, including a manipulator disk 22, an attachment rod 24, and a control rod 26. The manipulator disk 22 is sized to substantially cover the main opening 13 in the cross-hairs 12. The manipulator disk 22 has a central opening 30, an attachment rod hole 32 and a control rod hole 34 located outwardly of the central opening 30 at substantially the same radial distance therefrom, and a plurality of venturi holes 36 that extend around the manipulator disk 22 and are located at substantially the same radial distance outside of the central opening 30. The venturi holes 36 allows air flow through the manipulator disk 22 when in use. The control rod hole 34 is internally threaded.

The attachment rod 24 has a first end 241 and a second end 242. The attachment rod 24 is threaded at the first end 241 and has a hook 25 at the second end 242. The control rod 26 has a first end 261 and a second end 262. An attachment rod wingnut 29 and a washer 31 are provided for use with the attachment rod 24 in a manner that will be described hereinafter.

The control rod 26 is threaded substantially between the first end 261 and second end 262. A control rod wingnut 35A and jamnut 35B combination together form a control handle 35 which is attached to the control rod 26 in a fixed position on the threads thereof, near the first end 261 thereof, and is used to rotate the control rod 26.

Figure 4:
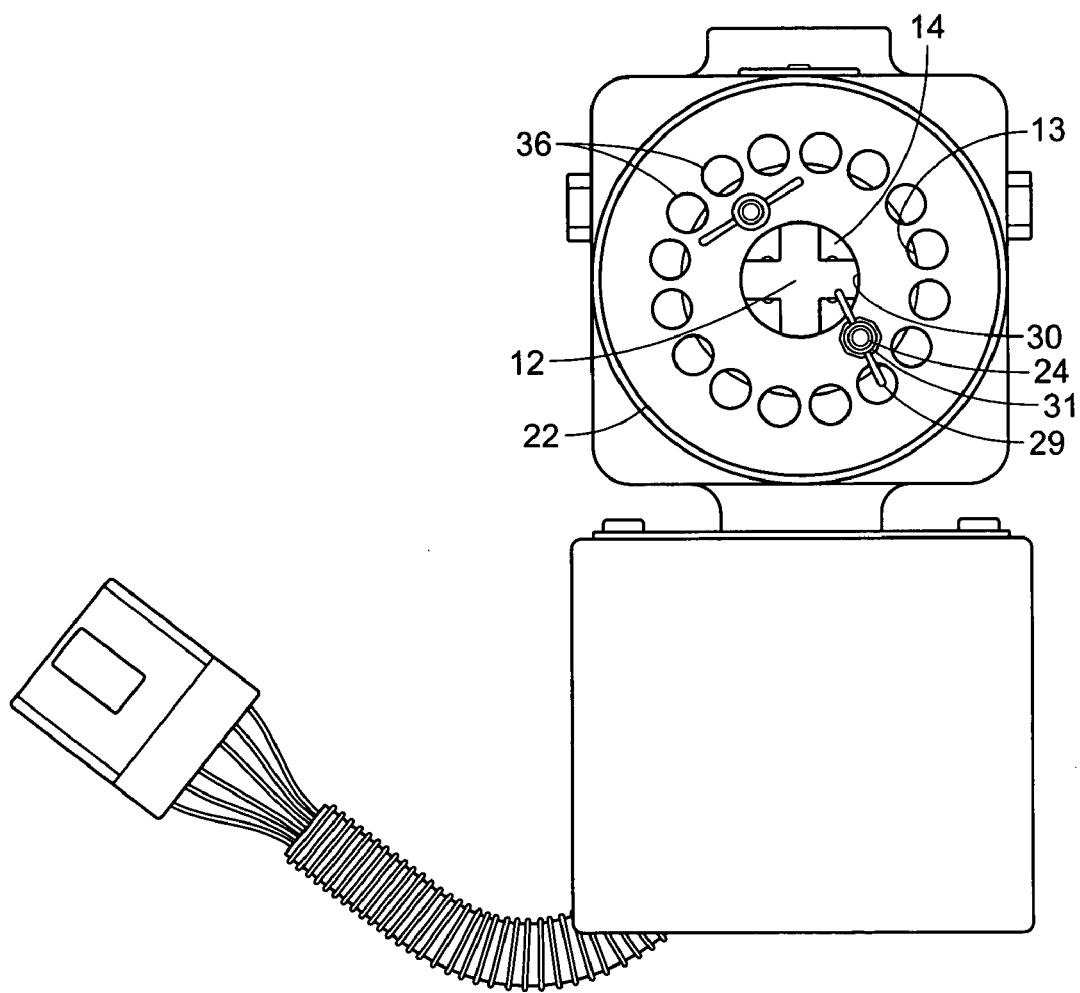
FIG. 4 is a front elevational view, showing the throttle plate manipulator mounted to the gas mixer.
Figure 5:
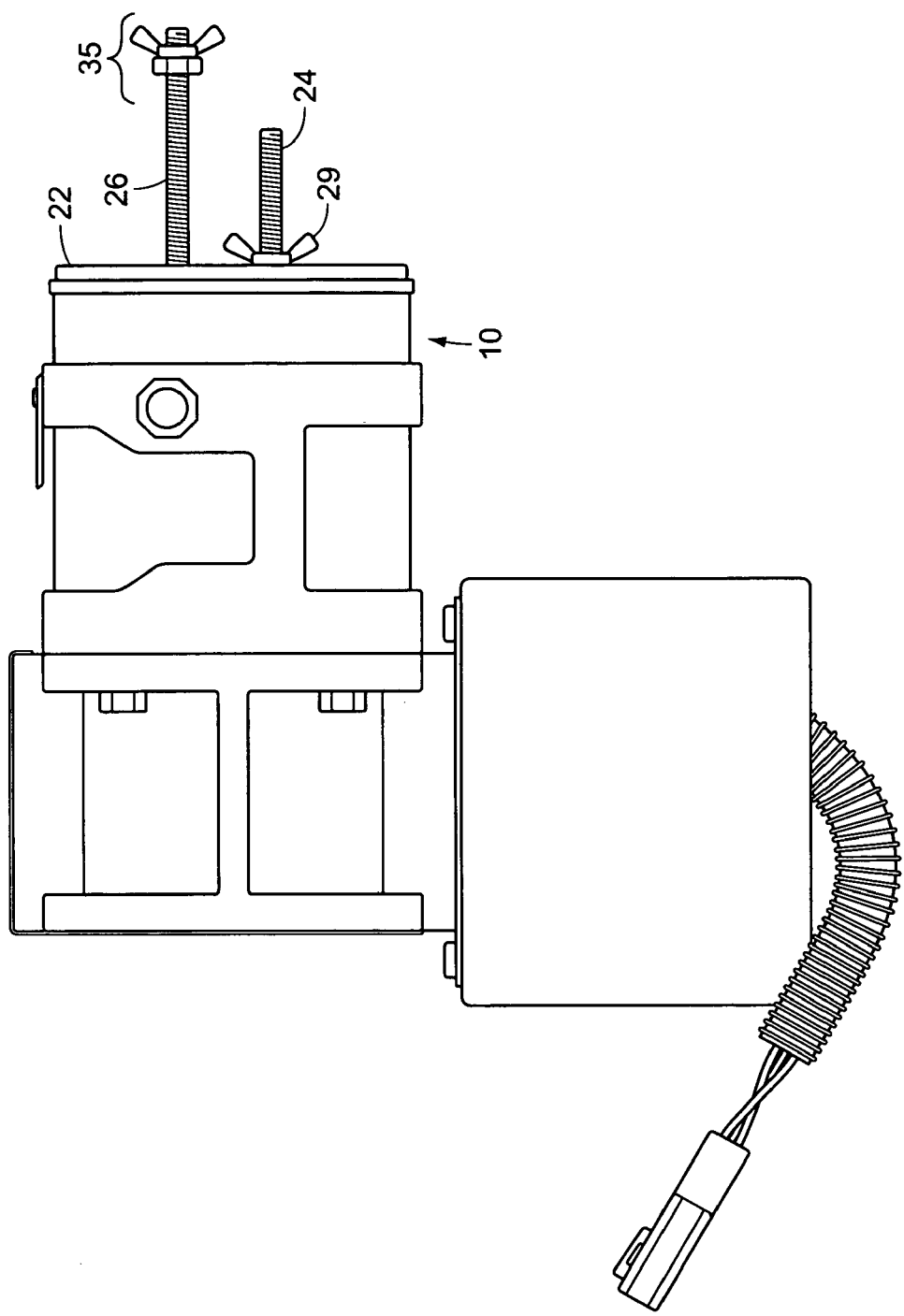
FIG. 5 is a side elevational view thereof.

In use, Referring to FIGS. 4 and 5, the throttle plate manipulator disk 22 is aligned within the main opening 13 on the cross-hairs 12 of the gas mixer 10, such that throttle plate manipulator disk 22 substantially covers said main opening. The attachment rod 24 is then inserted through the attachment rod hole 34 such that the attachment rod is hooked behind the cross-hairs 12, such that the attachment rod hook 25 engages one of the vertical bar 12V and the horizontal bar 12H of the cross-hairs and becomes hooked therebehind. Then, as the attachment rod is tightened against the manipulator disk 22, the hook 25 securely holds the disk 22 against the main opening 13. In particular, an attachment rod wingnut 29 is threaded onto the first end 241 of the attachment rod 241 and is tightened against the manipulator disk 22. Preferably, however, the washer 31 is interposed between the attachment rod wingnut 29 and the manipulator disk 22.

With the manipulator disk 22 securely in place, the control rod 26 can be used to manually manipulate the butterfly in order to operate the engine. In particular, the control rod 26 is threaded through the control rod hole 34, extends through the main opening 13, and engages the butterfly 14. As the control rod 26 is rotated further by turning the control handle 35, it advances toward the butterfly 14 and continues to depress against and move the butterfly inwardly, increasing air flow through the central opening 30 and through the venturi holes 36, and causing the engine to operate at increasing rotational speed. Accordingly, once the control rod 26 is sufficiently engaged against the butterfly, the bus can be driven.

In conclusion, herein described is a throttle plate manipulator, which may be used to manually set the throttle plate of an engine to allow it to operate. The invention is illustrated by example in the drawing figures, and throughout the written description. It should be understood that numerous variations are possible, while adhering to the inventive concept. Such variations are contemplated as being a part of the present invention.

What is claimed is:

1. A throttle plate manipulator, allowing operation of an engine having a throttle plate, the throttle plate having a gas mixer having cross-hairs including a main opening and vertical and horizontal bars extending across the opening, the throttle plate having a butterfly located behind the cross hairs that controls the engine speed, comprising:

a manipulator disc, having a central opening centrally located thereon, a control rod hole and an attachment rod hole, the control rod hole is internally threaded, the manipulator disc sized to fit over the cross hairs and fully cover the main opening;

an attachment rod, having a first end and a second end, the attachment rod threaded at the first end and having a hook at the second end, such that the attachment rod extends through the attachment rod hole and the hook engages one of the vertical bars of the cross-hairs and allows the manipulator disc to be secured against the gas mixer;

a control rod having a first end and second end, the control rod is substantially threaded between the first end and second end, a control handle is located at the first end, the control rod extends through the control rod hole, such that when the manipulator disc is secured against the cross-hairs, the control rod extends against the butterfly and presses thereagainst such that when the control rod is rotated it pushes against the butterfly to manually increase the engine speed.

2. The throttle plate manipulator as recited in claim 1, further comprising an attachment rod wingnut which is secured upon the attachment rod at its first end for allowing the manipulator disc to be secured against the gas mixer by securing said attachment rod wingnut against the manipulator disc.

3. The throttle plate manipulator as recited in claim 2, wherein the manipulator disc has a plurality of venturi holes that extend through the manipulator disc, the venturi holes located outwardly of central opening by substantially the same radial distance.

4. A throttle plate manipulator, allowing operation of an engine having a throttle plate, the throttle plate having a gas mixer having cross-hairs including a main opening and vertical and horizontal bars extending across the opening, the throttle plate having a butterfly located behind the cross hairs that controls the engine speed, comprising:

a manipulator disc, having a central opening centrally located thereon, the manipulator disc sized to fit over the gas mixer fully over the main opening thereof;

an attachment mechanism, for selectively securing the manipulator disc to against the gas mixer; and a control rod attached to the manipulator disc, such that when the manipulator disc is secured against the gas mixer the control rod extends through the cross-hairs, against the butterfly and presses thereagainst, such that when the control rod is rotated it pushes against the butterfly to manually increase fuel-air flow through the manipulator disc into the butterfly and thereby increase the engine speed.

5. The throttle plate manipulator as recited in claim 4, wherein the manipulator disc has a plurality of venturi holes disposed around the central opening.

6. The throttle plate manipulator as recited in claim 5, wherein the control rod has a first end and a second end, the control rod threaded substantially between the first end and second end, the manipulator disc has a control rod hole that is internally threaded, the control rod has a first end and a second end, with a control handle located at the first end, wherein the control rod extends through the control rod hole while the second end engages the butteryfly, and wherein when the control handle is rotated the control rod advances toward the butterfly and presses inwardly thereagainst.

7. The throttle plate manipulator as recited in claim 6, wherein the attachment mechanism includes an attachment rod having a first end and a second end, a hook is located at the second end of the attachment rod, the manipulator disc has an attachment rod hole, and wherein the attachment rod extends through the attachment rod hole such that when the manipulator disc is in place on the gas mixer the hook engages one of the bars of the cross hairs while the first end of the attachment rod is secured to the manipulator disc.

8. A throttle plate manipulator method, for allowing operation of an engine having a throttle plate, the throttle plate having a gas mixer having cross-hairs including a main opening and vertical and horizontal bars extending across the opening, the throttle plate having a butterfly located behind the cross hairs that controls the engine speed, using a throttle plate manipulator including a manipulator plate having a central opening, including an attachment mechanism, and including a control rod connection to the manipulator plate, comprising the steps of:

attaching the manipulator plate onto the gas mixer by aligning the manipulator plate over the cross hairs and securing the manipulator plate onto the gas mixer using the attachment mechanism;

engaging the butterfly with the control rod;

allowing fuel-air flow through the manipulator plate, through the cross-hairs, and into the butterfly by opening the butterfly with the control rod.

9. The throttle plate manipulator method as recited in claim 8, wherein the control rod is threaded, has a first end and a second end, wherein the manipulator plate has a control rod hole such that the control rod extends through the control rod hole, and wherein the step of opening the butterfly with the control rod further comprises the step of advancing the control rod toward the butterfly by rotating the rod.

10. The throttle plate manipulator method as recited in claim 9, wherein the attachment mechanism includes an attachment rod having a first end and a second end with a hook at the second end, and includes an attachment rod wingnut, wherein the manipulator plate has an attachment rod hole, and wherein the step of securing the manipulator plate onto the gas mixer further comprises extending the attachment rod through the attachment rod hole, hooking one of the bars of the cross-hairs with the hook, and securing the attachment rod to the manipulator plate at the first end of the attachment rod with the wingnut.

\* \* \* \* \*